United States Patent
Hamada

(10) Patent No.: US 7,081,160 B2
(45) Date of Patent: Jul. 25, 2006

(54) AZOBARBITURIC ACID METAL COMPLEX PIGMENT AND PROCESS FOR THE PRODUCTION THEREOF

(75) Inventor: Naoki Hamada, Tokyo (JP)

(73) Assignee: Toyo Ink Mfg. Co., Ltd., Tokyo (JP)

( * ) Notice: Subject to any disclaimer, the term of this patent is extended or adjusted under 35 U.S.C. 154(b) by 39 days.

(21) Appl. No.: 11/169,673

(22) Filed: Jun. 30, 2005

(65) Prior Publication Data
US 2006/0000391 A1   Jan. 5, 2006

(30) Foreign Application Priority Data
Jul. 2, 2004   (JP) .............................. 2004-196373

(51) Int. Cl.
*C09B 45/14* (2006.01)
*C09D 11/02* (2006.01)
*C09D 11/00* (2006.01)

(52) U.S. Cl. ...................................... 106/496; 534/707

(58) Field of Classification Search ................ 106/496; 534/707
See application file for complete search history.

(56) References Cited

U.S. PATENT DOCUMENTS

| | | | |
|---|---|---|---|
| 3,869,439 A * | 3/1975 | Schundehutte | 534/707 |
| 4,622,391 A | 11/1986 | Lorenz et al. | |
| 4,628,082 A * | 12/1986 | Lorenz et al. | 534/707 |
| 6,077,339 A | 6/2000 | Nyssen et al. | |
| 6,211,346 B1 * | 4/2001 | Linke et al. | 534/707 |
| 6,261,358 B1 * | 7/2001 | Sommer et al. | 106/496 |
| 6,281,338 B1 * | 8/2001 | Sommer et al. | 534/581 |
| 6,350,307 B1 * | 2/2002 | Linke et al. | 106/496 |
| 6,448,385 B1 * | 9/2002 | Herrmann et al. | 534/707 |
| 6,596,446 B1 | 7/2003 | Wolf et al. | |
| 2001/0047087 A1 | 11/2001 | Hermann et al. | |
| 2002/0034696 A1 | 3/2002 | Wolf et al. | |
| 2002/0111465 A1 * | 8/2002 | Linke et al. | 534/703 |

FOREIGN PATENT DOCUMENTS

| | | |
|---|---|---|
| EP | 0 839 879 A2 | 5/1998 |
| EP | 0 994 164 A1 | 4/2000 |
| EP | 1 086 992 A1 | 3/2001 |
| EP | 1 142 960 A2 | 10/2001 |
| EP | 1 146 087 A1 | 10/2001 |

* cited by examiner

*Primary Examiner*—Anthony J. Green
(74) *Attorney, Agent, or Firm*—Wenderoth, Lind & Ponack, L.L.P.

(57) ABSTRACT

An azobarbituric acid metal complex pigment comprising an azobarbituric acid metal complex of the formula (1), melamine and a compound of the formula (2), which pigment has an average primary particle diameter of 20 nm to 200 nm and a pigment primary particle aspect ratio of 1:1 to 3:1 and is fine and excellent in flowability, transparency and stability with time, and a process for the production of the above pigment

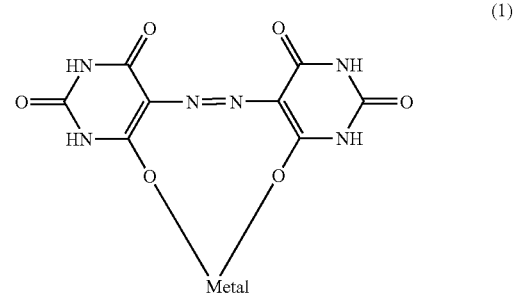

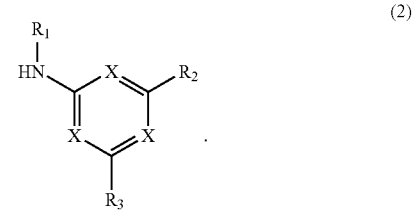

8 Claims, No Drawings

AZOBARBITURIC ACID METAL COMPLEX PIGMENT AND PROCESS FOR THE PRODUCTION THEREOF

FIELD OF THE INVENTION

The present invention relates to an azobarbituric acid metal complex pigment and a process for the production thereof. More specifically, it relates to an azobarbituric acid metal complex pigment using melamine and a compound represented by the formula (2) as compounds to be included, and a process for the production thereof.

BACKGROUND OF THE INVENTION

In a variety of coatings or ink compositions, practically useful pigments exhibiting a clear color tone and high tinting strength are generally composed of fine particles. However, when the fine particles of pigments are dispersed in a non-aqueous vehicle such as an offset ink, a gravure ink, a resist ink for a color filter, an inkjet ink and a coating, it is difficult to obtain a stable dispersion. For this reason, a variety of problems are caused which exerts significant influences on fabricating jobs and the value of a product obtained.

For example, dispersions containing pigments formed of fine particles often show high viscosity and it is difficult to take out a product from a dispersing machine and to transfer it from the dispersing machine to a tank or the like. In worse cases, the product undergoes gelation during storage and becomes difficult to use. Further, when such a dispersion is mixed with a different kind of pigment, a coated matter sometimes suffers uneven coloring or a remarkable decrease in tinting strength because of a phenomenon such as segregation or settling due to the agglomeration of the pigments. In addition, with regard to the surface of coating film of the coated matter, a poor state such as a decrease in gloss or poor leveling occurs in some cases. Furthermore, while not directly related to the dispersing of pigment, some organic pigments suffer a phenomenon which accompanies a change of the crystal condition of the pigments. That is, with regard to an offset ink, a gravure ink, an ink for a color filter, a coating or the like, pigment crystal particles which are energetically unstable in a vehicle change in their size or shape and move to a stable state, so that the commercial value of a coated matter thereof is impaired by a remarkable change in hue, a decrease in tinting strength, the occurrence of coarse particles, etc., in some cases.

Pigments used for color filters or inkjet printings are required to have high heat resistance and weather resistance. The pigments to be used are phthalocyanine pigments, diketopyrrolopyrrole pigments, quinacridone pigments, isoindolin pigments, isoindolinone pigments, benzimidazolone pigments, quinophthalone pigments, azo metal complex pigments, etc. Of these, an azobarbituric acid nickel complex, i.e., C.I. Pigment Yellow 150 is a pigment having high tinting strength and it is widely used at the present time. However, it is difficult to control particles of the above pigment when it does not have a compound to be included. In this case, strong agglomeration occurs or its particles become uneven so that it is a difficult-to-disperse pigment. Further, it is known that the above pigment has crystal water and it is thermally unstable.

JP-A-58-52361 and JP-A-2000-119544 propose to improve dispersing by adjusting a pH by allowing an azobarbituric acid metal complex to include a compound, particularly preferably melamine. This method improves weather resistance and heat resistance. However, a pigment including melamine alone is still a difficult-to-disperse pigment and, in addition, large variation in quality is found in a batch production. Therefore, for dispersing the above pigment in a vehicle, it is required to disperse the above pigment mechanically by applying considerable energy or to concurrently use a so-called pigment derivative having a basic or acidic group introduced in a pigment structure. In each case, the cost required increases. In particular, the latter case has an adverse effect on resistance properties in some cases.

Further, it is known that dispersing is improved by adding a metal carboxylate or a surfactant when a stable pigment dispersion is desired. However, a considerable amount of the carboxylate or surfactant is required for obtaining a necessary effect. In some cases, the addition thereof causes a decrease in heat resistance or weather resistance, an increase in migration, etc., so that some properties, which are required when used to prepare a printing ink, a coating, an inkjet ink or a resist ink for a color filter, are lost. It is urgently desired to obtain a pigment dispersion excellent in dispersing without losing various resistance properties and it is accordingly required to improve the dispersibility of pigment.

SUMMARY OF THE INVENTION

It is an object of the present invention to provide an azo metal complex pigment which has high weather resistance and is composed of fine particles and excellent in fluidity, transparency and gloss which pigment is suitable for use in a resin colorant, a coating, a color filter, an inkjet ink, etc.

The present invention provides an azobarbituric acid metal complex pigment comprising an azobarbituric acid metal complex of the formula (1), melamine in an amount of 1.0 to 1.95 mol per mol of the azobarbituric acid metal complex and a compound of the formula (2) in an amount of 0.05 to 1.0 mol per mol of the azobarbituric acid metal complex,

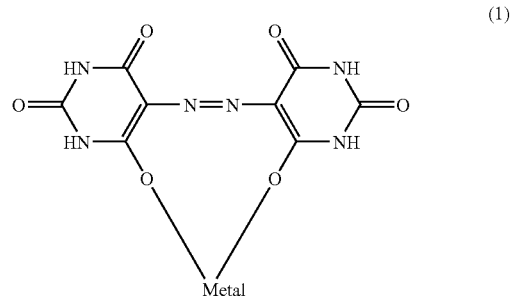

wherein Metal represents Fe, Ni, Cu, Cs, Cd, Co, Al, Cr, Sn, Pb or Mn,

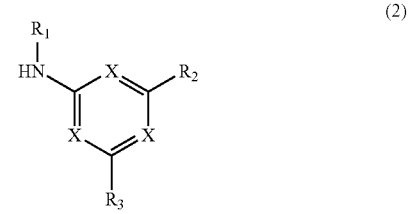

wherein X represents a carbon atom or a nitrogen atom, $R_1$ represents a hydrogen atom, a substituted or non-substituted phenyl group or a nitrogen-containing heterocyclic residue, $R_2$ represents an alkyl group having 1 to 6 carbon atoms, an amino group, a hydroxyl group, a chlorine atom, a bromine atom, —$NR_5R_6$ or —NH—$R_4$—$NR_5R_6$, $R_3$ represents —$NR_5R_6$ or —NH—$R_4$—$NR_5R_6$, $R_4$ represents an alkylene group having 1 to 6 carbon atoms, and each of $R_5$ and $R_6$ represents an alkyl group having 1 to 6 carbon atoms or an alkenyl group.

The present invention further provides an azobarbituric acid metal complex pigment according to the above, wherein the average particle diameter of pigment primary particles is 20 nm to 200 nm and the ratio of the major axis diameter and the minor axis diameter of the pigment primary particles is 1:1 to 3:1.

The present invention furthermore provides a process for the production of the above azobarbituric acid metal complex pigment, which process comprises a first step of obtaining an azobarbituric acid from a barbituric acid, a second step of reacting the azobarbituric acid, melamine, a compound of the formula (2) and a metal salt in water to obtain a crude metal complex pigment, and a third step of growing crystals of the crude metal complex pigment in a mixture of an organic solvent and water in the presence of a surfactant.

The present invention still further provides a process according to above, wherein the organic solvent is at least one solvent selected from the group consisting of isobutanol, isopropanol, ethanol, methanol, xylene and toluene.

The present invention further provides a pigment composition obtained by further incorporating a resin type pigment dispersing agent into the above azobarbituric acid metal complex pigment.

Effect of the Invention

The pigment of the present invention is easily produced. The use of the pigment of the present invention can give an ink, such as an offset ink, a gravure ink, an ink for a color filter and an ink for inkjet, and a coating each of which is not only excellent in non-agglomeration properties, non-crystallizing properties and fluidity but also excellent in the gloss and hue of a coating film. Accordingly, the productivity in each step, such as ink production, coating production or printing, can be increased.

DETAILED DESCRIPTION OF THE INVENTION

"to include a compound" in the present invention refers to a state where the included compound has an interaction with an azobarbituric acid. That is, when the azobarbituric acid includes a compound, the compound is not washed away by filtering, etc., unlike a powder-mixing case and a large influence such as crystal growth or an increase in heat resistance is found in physical properties.

The first step of the process for the production of the pigment, provided by the present invention, is a step of obtaining an azobarbituric acid. This step is achieved by a known production process. That is, a barbituric acid is converted into a diazobarbituric acid by using a known diazotizing agent which is prepared from paratoluene sulfonylhydrazide, benzene sulfonylhydrazide, dodecylbenzene sulfonylhydrazide, aminoguanidine bicarbonate, etc., and then the diazobarbituric acid is coupled with a barbituric acid to obtain an azobarbituric acid. This azobarbituric acid is present as a salt of sodium, potassium, etc., and also may be present as a hydrate having one or two water molecules.

When the known diazotizing agent used is insoluble in water, it is required to add the diazotizing agent in an emulsified state. Further, when the diazotizing agent used is insoluble or hardly soluble in water, a byproduct remains as impurities after the synthesis of the azobarbituric acid and therefore, when allowing the azobarbituric acid to include melamine or the compound represented by the formula (2), failures sometimes occur. In this case, it is required to remove the byproduct with an alcohol, hot water or the like, at the point of time when the azobarbituric acid is synthesized. This operation gets rid of any influence based on the difference of the diazotizing agent and, therefore, the diazotizing agent can be chosen in consideration of cost or yield.

The second step is a step of obtaining a crude metal complex pigment by forming a complex of the azobarbituric acid obtained in the first step with a metal salt and allowing the azobarbituric acid to include melamine and a compound represented by the formula (2). 1.0 to 1.9 mol of the melamine is added to the azobarbituric acid dispersed in 10 to 30 times amount of water and 0.1 to 1.0 mol of the specific compound represented by the formula (2) is added. The mixture is stirred until it is confirmed that these materials are homogeneously dispersed in the water. Then, the metal salt diluted with 3 to 10 times amount of water is added thereto over 0.1 to 1 hour. The pH of the mixture is adjusted at from 1 to 3 and then complex formation is carried out at a temperature of at least 80° C. for 1 to 2 hours.

The metal salt used in the second step can be selected from metal acetates, metal bromides, metal chlorides, etc. Of these, the metal chlorides are preferred. Preferable metals in the present invention are iron, nickel, copper, cadmium, cobalt, aluminum, chromium, tin, lead and manganese. The metal can be selected depending upon a required hue. The metal chlorides are typically nickel chloride, iron chloride, copper chloride, cadmium chloride, cesium chloride, cobalt chloride, aluminum chloride, chromium chloride, tin chloride, lead chloride, manganese chloride, etc. The metal salt may be used alone, and at least two metal salts may be used in combination when an intermediate hue is desired.

The compound of the formula (2) used in the second step refers to a compound having a benzene ring, a triazine ring, a pyridine ring or a pyrimidine ring each of which has two or more primary or secondary amino groups as substituents. The benzene ring, the triazine ring, the pyridine ring or the pyrimidine ring may be substituted with two amino groups. When one or less amine is substituted, the interaction with the balbituric acid becomes small so that such a compound is not preferable as the compound of the formula (2). It is sufficient that the benzene ring, the triazine ring, the pyridine ring or the pyrimidine ring is substituted with two or more amino groups, and a substituted or non-substituted phenyl group or a nitrogen-containing heterocyclic ring may be bonded through the amine groups.

The substituted or non-substituted phenyl group in the present invention refers to a phenyl group which may have a substituent such as a hydroxyl group, an amino group, a sulfonyl group, a nitro group, a methyl group or a carbonyl group. Further, the nitrogen-containing heterocyclic ring is typically carbazole, quinoline, quinoxaline, phthalimide, benzimidazolone, quinazoline, quinacridone, pyrrolopyrrole, acridone, acridine, indazole, etc.

Further, it is required that the compound of the formula (2) have a tertiary amine. Since pigment particles including the compound of the formula (2) become a semi-dissolution state in a pigmentation step carried out in weak-acidification and since steric hindrance and electrical repulsion are present, the presence of the tertiary amine has effects such as an effect of preventing crystal growth, an effect of preventing agglomeration and an effect of making the diameter of particles homogeneous. When the particles are homogeneous, i.e., the particle size distribution is sharp, not only it is very advantageous in terms of dispersing but also an effect such as a decrease in scattering rate is obtained.

In the present invention, 1.0 to 1.95 mol of melamine and 0.05 to 1.0 mol of the compound represented by the formula (2) can be used per 1 mol of the azobarbituric acid. The total of the melamine and the compound of the formula (2) per mol of the azobarbituric acid is preferably 2 mol. More preferably, the amount of the compound of the formula (2) per mol of the azobarbituric acid is 0.05 to 0.2 mol. When the amount of the compound of the formula (2) exceeds 1.0 mol, thickening occurs at a dispersing time in some cases. When it is less than 0.05 mol, desired effects such as an effect of crystal growth prevention, an effect of stable dispersing or an effect of agglomeration prevention cannot be obtained.

Table 1 shows particularly preferred specific examples of the compound of the formula (2), which is used as a compound to be included in the second step. However, the present invention shall not be limited to the following compounds.

TABLE 1

(a)

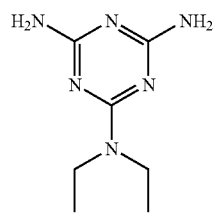

(b)

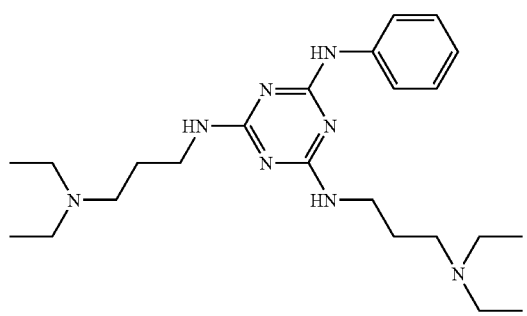

(c)

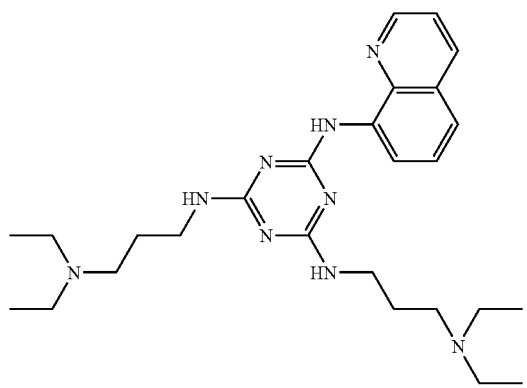

(d)

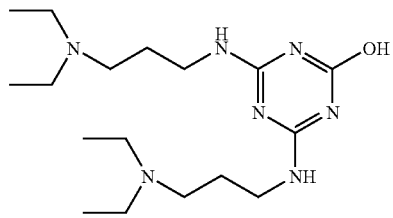

TABLE 1-continued
(e) 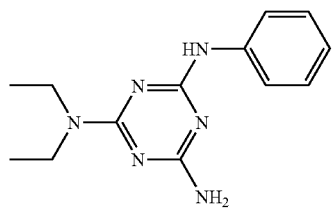
(f) 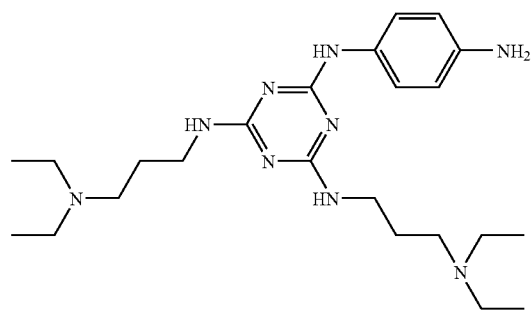
(g) 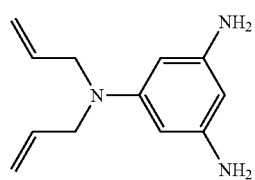
(h) 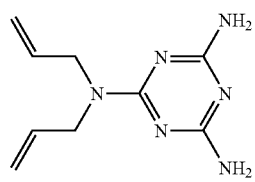
(i) 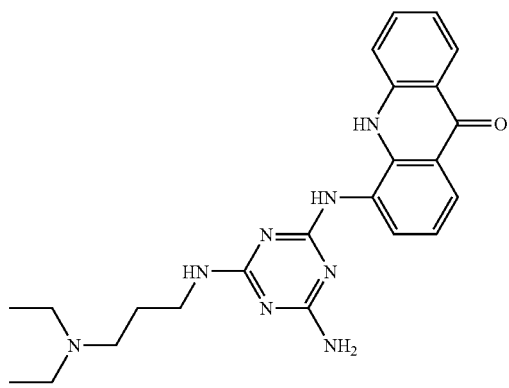
(j) 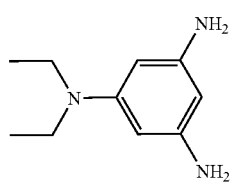

TABLE 1-continued
(k) 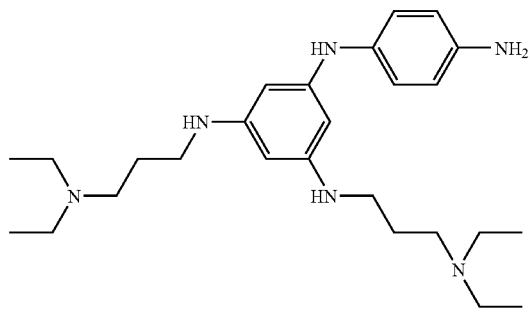
(l) 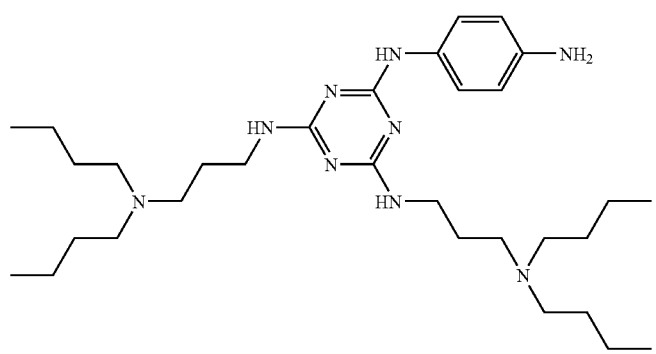
(m) 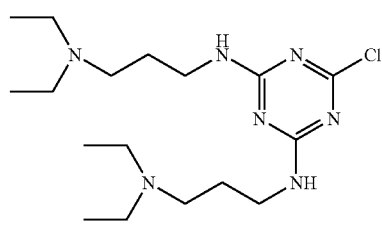
(n) 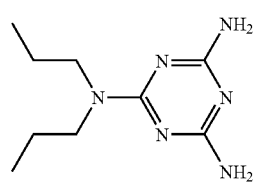
(o) 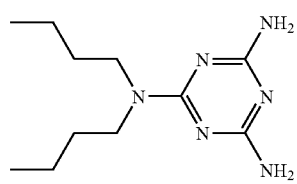
(p) 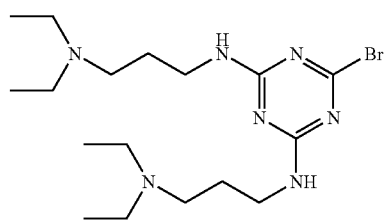

TABLE 1-continued (q)
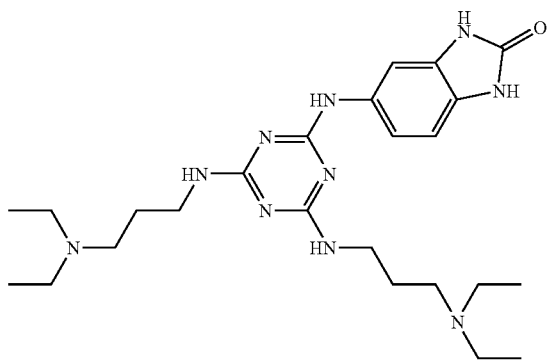

(r)
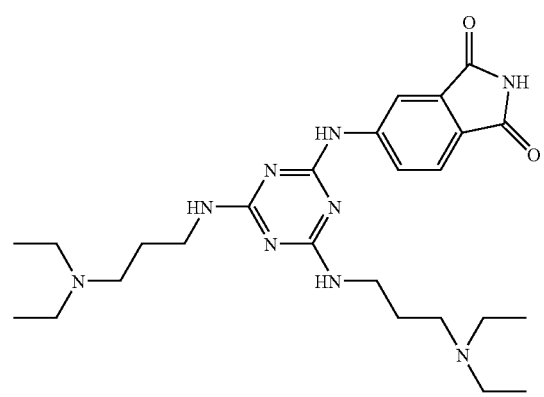

The crude pigment obtained in the second step has a very fine pigment primary particle diameter. For this reason, when directly used, the crude pigment is difficult to disperse. Generally, the dispersibility of a pigment is largely affected by its surface state and its particle diameter and aspect ratio. For this reason, for improving the dispersibility it is necessary to grow crystals of particles of the crude pigment with retaining a small aspect ratio in the third step. When melamine alone is used as a compound to be included, it is possible to carry out pigmentation by using water alone as a solvent. However, concerning the pigment of the present invention, the crystal growth prevention effect is large so that it is required to add an organic solvent and a surfactant.

The third step is a pigmentation step of adjusting the particles with a mixture comprising the organic solvent, water and the surfactant. The intended pigment can be obtained by a method in which the pigmentation is carried out directly from the second step by adding the organic solvent and the surfactant or a method in which filtering is once carried out after the second step to obtain a presscake and the presscake is added to a mixture containing the organic solvent, water and the surfactant to carry out the pigmentation.

The organic solvent used in the third step can be selected from aromatic organic solvents such as toluene, xylene, para-chlorotoluene, chlorobenzene and an alkylbenzene having 9 to 15 carbon atoms, alcohol solvents such as isopropyl alcohol, methanol, ethanol and isobutanol, and water-soluble aprotic solvents such as N,N-dimethylformamide, N,N-dimethylacetamide and dimethyl sulfoxide, and the like. The alcohol solvents and aromatic organic solvents are preferable. Particularly preferably, isobutanol, toluene or xylene is used.

The surfactant used in the present invention can be selected from nonionic surfactants, anionic surfactants and cationic surfactants. Examples of the surfactant used in the third step include polyoxyalkylene alkyl phenol ethers such as polyoxyethylene nonyl phenol ether, polyoxyethylene dinonyl phenol ether, polyoxyethylene octyl phenol ether, polyoxyethylene styrenated phenol, polyoxy polyoxyethylene bisphenol A, polyoxyethylene nonyl phenyl ether, polyoxyethylene octyl phenyl ether and nonyl phenol ethoxylate; polyoxyalkylene ethers such as polyoxyethylene castor oil, polyoxyalkylene block polymer, polyoxyethylene cetyl ether, polyoxyethylene lauryl ether, polyoxyethylene oleyl ether, polyoxyethylene stearyl ether and polyoxypropylene ether; glycols such as monool type polyoxyalkylene glycol, diol type polyoxyalkylene glycol, triol type polyoxyalkylene glycol, monool block type polyalkylene glycol, diol block type polyalkylene glycol and random type polyalkylene glycol; alkyl alcohol ethers such as a primary linear alcohol ethoxylate typified by octyl phenol ethoxylate, oleyl alcohol ethoxylate or lauryl alcohol ethoxylate, a secondary linear alcohol ethoxylate and a polynuclear phenol ethoxylate; polyoxyalkylene alkyl esters such as polyoxyethylene rosin ester, polyoxyethylene lauryl ester, polyoxyethylene oleyl ester and polyoxyethylene stearyl ester; sorbitan fatty acid esters such as sorbitan monolaurate, sorbitan monopalmitate, sorbitan monostearate, sorbitan dilaurate, sorbitan dipalmitate, sorbitan distearate, sorbitan sesquilaurate, sorbitan sesquipalmitate and sorbitan sesquistearate; polyoxyethylene sorbitan esters such as polyoxyethylene sorbitan monolaurate, polyoxyethylene sorbitan monopalmitate, polyoxyethylene sorbitan monostearate, polyoxyethylene sorbitan dilaurate, polyoxyethylene sorbitan dipalmitate, polyoxyethylene sorbitan distearate, polyoxyethylene sorbitan sesquilaurate, polyoxyethylene sorbitan sesquipalmitate and polyoxyethylene sorbitan sesquistearate; fatty acid esters such as saturated fatty acid methyl ester, unsaturated fatty acid methyl ester, saturated fatty acid butyl ester, unsaturated fatty acid butyl ester, saturated fatty acid stearyl ester, unsaturated fatty acid stearyl ester, saturated fatty acid octyl ester, unsaturated fatty acid octyl ester, stearic acid polyethylene glycol ester, oleic acid polyethylene glycol ester and rosin polyethylene glycol ester; fatty acids such as stearic acid, oleic acid, palmitic acid, lauric acid and myristic acid, amidation compounds of these fatty acids and metal salts of these fatty acids; polyoxyethylene alkylamines such as polyoxyethylene lauryl amine, polyoxyethylene alkylamine and polyoxyethylene alkylamine ether; higher fatty acid monoethanol amides and higher fatty acid diethanol amides such as lauric acid monoethanol amide and coconut fatty acid diethanol amide; amide compounds and alkanolamides such as polyoxyethylene stearic acid amide, coconut diethanolamide (1-2 type/1-1 type) and alkyl alkylol amide; alkanolamines represented by R— $(CH_2CH_2O)mH$ $(CH_2CH_2O)nH$ or R—NH—$C_3H_6$—$NH_2$ [R=oleyl, octyl, dodecyl, tetradecyl, hexadecyl, octadecyl, coconut, beef tallow, soybean, etc., and each of m and n is an integer of at least 0]; primary amines represented by R—$NH_2$ [R=oleyl, octyl, dodecyl, tetradecyl, hexadecyl, octadecyl, coconut, beef tallow, soybean, etc.]; secondary amines represented by $R^1R^2$—NH [$R^1,R^2$=R=oleyl, octyl, dodecyl, tetradecyl, hexadecyl, octadecyl, coconut, beef tallow, soybean, etc.]; tertiary amines represented by $R^1R^2R^3N$ [$R^1$, $R^2$, $R^3$=oleyl, octyl, dodecyl, tetradecyl, hexadecyl, octadecyl, coconut, beef tallow, soybean, etc.]; various synthetic higher alcohols and various natural higher alcohols; polymers and oligomers such as an acrylic acid compound, a polycarboxylic acid compound, a hydroxy fatty acid oligomer and a modified product of a hydroxy fatty acid oligomer; etc. Particularly preferred are higher fatty acid monoetheramides, polyoxyethylene alkylene ether or a linear carboxylic acid alkali salt.

The average primary particle diameter of the pigment of the present invention is 20 to 200 nm in most cases. The above particle diameter range is preferable in view of its use. When the particle diameter is smaller than 20 nm, undesirably, it is very difficult to disperse the pigment and in addition the heat resistance is decreased. When the particle diameter is larger than 200 nm, it is longer than the half of the wavelength of visible light. In this case, it is disadvantageous in uses using a transmitted light because of an influence of scattering. The most preferred particle diameter varies depending upon a desired use, while a pigment having a particle diameter of 50 to 100 nm is further preferably used for a variety of uses.

The measuring method of the pigment primary particle diameter in the present invention is a general method in which the sizes of pigment primary particles are directly measured from a transmission electron micrograph. Specifically, the major axis diameter and the minor axis diameter of a primary particle are measured and the average of the major axis diameter and the minor axis diameter is considered as the particle diameter of the above primary particle. With regard to 100 or more particles, the volume (weight) of each of the particles is individually obtained by making an approximation to the cube of the particle diameter thereof as obtained above, and a volume average particle diameter is obtained. The volume average particle diameter is considered as an average primary particle diameter. Further, an average of the major axis diameters and an average of the minor axis diameters are respectively obtained and the ratio of major axis diameter/minor axis diameter is an aspect ratio.

The pigment composition of the present invention may further contain a resin type pigment dispersing agent for further increasing the dispersing effect. The resin type pigment dispersing agent is a polymer which is formed of a polyester type resin, a polyolefin type resin or a polyurethane type resin, has a functional group such as an amino group, a hydroxyl group, a carboxylic group, a carboxylic acid ester or an amide group in a side chain and has a weight average molecular weight of 1,000 to 100,000. When the weight average molecular weight of the resin type pigment dispersing agent is smaller than 1,000, sufficient steric hindrance cannot be obtained and a dispersing effect decreases. When the weight average molecular weight is larger than 100,000, undesirably, an agglomeration behavior occurs in some cases. Further, the acid value or amine value of the resin type pigment dispersing agent is preferably 5 to 200 mgKOH/g. When the acid value or amine value of the resin type pigment dispersing agent is smaller than 5 mgKOH/g, the interaction of the pigment dispersing agent with the pigment of the present invention is apt to be insufficient. In this case, it is sometimes impossible to obtain a sufficient dispersing effect even when the pigment dispersing agent adsorbs to a pigment surface. On the other hand, when the acid value or amine value of the resin type pigment dispersing agent exceeds 200 mgKOH/g, undesirably, a steric hindrance layer becomes smaller as compared with an affinity portion for the pigment component and a dispersing effect is sometimes insufficient. The resin type pigment dispersing agent is particularly preferably a resin type pigment dispersing agent obtained by polymerizing an acrylic acid monomer and an acrylic acid derivative monomer. This resin type pigment dispersing agent has a carboxylic acid at a side chain of resin and it generates a strong interaction with the tertiary amine of the compound of the formula (2) and can contribute to dispersing stability.

A pigment dispersion of the pigment composition of the present invention dispersed in a vehicle can be obtained by mixing the pigment composition of the present invention with a solvent, a photosensitive resin, a vehicle, a commercially-available dispersing agent, etc., as required, and carrying out dispersing with a horizontal sand mill, a vertical sand mill, an annular type bead mill, an attritor or the like.

Further, the pigment composition of the present invention may further contain vehicle. Examples of the vehicle used include a petroleum resin, casein, shellac, a rosin-modified maleic acid resin, a rosin-modified phenol resin, cellulose nitrate, cellulose acetate butylate, cyclized rubber, chlorinated rubber, oxidized rubber, hydrochlorinated rubber, a phenol resin, an alkyd resin, a polyester resin, an unsaturated polyester resin, an amino resin, an epoxy resin, a vinyl resin, vinyl chloride, a vinyl chloride-vinyl acetate copolymer, an acrylic resin, a methacrylic resin, a polyurethane resin, a silicon resin, fluororesin, drying oil, synthetic drying oil, styrene-modified maleic acid, a polyamide resin, a polyimide resin, a benzoguanamine resin, a melamine resin, a urea resin chlorinated polypropylene, a butyral resin, a vinylidene chloride resin, etc.

As the photosensitive resin of the present invention, there are used resins obtained by introducing a photocrosslinkable group such as a (meth)acryloyl group or a styryl group into a linear polymer having a reactive substituent such as a hydroxyl group, a carboxylic group or an amino group by a reaction between a (meth)acrylic compound having a reactive substituent such as an isocyanate group, an aldehyde group or an epoxy group or a cinnamic acid and the above linear polymer. Further, there may be used resins obtained by half-esterification of a linear polymer containing an acid anhydride such as a styrene-maleic anhydride copolymer or an α-olefin-maleic anhydride copolymer with a (meth) acrylic compound having a hydroxyl group such as hydroxyalkyl (meth)acrylate.

Examples of the solvent include cyclohexanone, ethylcellosolve acetate, butylcellosolve acetate, propylene glycol monomethylether acetate, diethylene glycol dimethyl ether, ethylbenzene, ethylene glycol diethyl ether, toluene, xylene, ethylcellosolve, methyl-n-amylketone, propylene glycol monomethylether, toluene, methyl ethyl ketone, methyl isobutyl ketone, ethyl acetate, butyl acetate, n-hexane, methanol, ethanol, isopropyl alcohol, butanol, dioxane, dimethylformamide, Solvesso 100 (supplied by Exxon Chemical Japan Ltd), Suwasol 1000, a petroleum type solvent, for inks, a lime rosin varnish, a gravure ink such as a polyamide resin varnish or a vinyl chloride resin varnish, a nitrocellulose lacquer, an air-dry or baking coating of an aminoalkyd resin, an acrylic lacquer, an amino acrylic resin baking coating, and an urethane resin coating. These solvents may be used alone or in combination.

EXAMPLES

The present invention will be explained with reference to Production Examples and Examples hereinafter. The present invention shall not be limited to these Examples. In the Production Examples and Examples, "%" stands for "% by weight" and "part" stands for "part by weight".

Intermediate Production Example 1 Preparation of azobarbituric acid disodium salt.

A separable four-necked flask was equipped with a thermometer, a cooling tube, a nitrogen-gas-introducing tube and a stirrer. The flask was charged with 150 parts of water, and 63 parts of 35% hydrochloric acid was dissolved therein to obtain a hydrochloric acid solution. 30 parts of aminoguanidine bicarbonate was dissolved in the solution with stirring the solution while attention was given to foaming. After the confirmation of dissolution, the solution temperature was decreased to 0° C. with an ice bath, and 19 parts of sodium nitrite was added over 30 minutes. The resultant mixture was stirred at a temperature between 0° C. and 15° C. for 30 minutes. Then, sulfamic acid was added until no coloring was found on a potassium iodide starch paper. Further, 25.6 parts of barbituric acid was added and the mixture was temperature-increased to 55° C. and stirred at this temperature for 2 hours. Further, 25.6 parts of barbituric acid was added and the mixture was temperature-increased to 80° C. Then, sodium hydroxide was added until the pH became 5.

Further, the resultant mixture was stirred at 80° C. for 3 hours and then temperature-decreased to 70° C., followed by filtering, washing with hot water and drying at 80° C., to obtain 61.4 parts of an azobarbituric acid disodium salt.

Intermediate Production Example 2 Preparation of azobarbituric acid disodium salt.

A separable four-necked flask was equipped with a thermometer, a cooling tube, a nitrogen-gas-introducing tube and a stirrer. The flask was charged with 150 parts of water, and 35% hydrochloric acid was added with stirring to obtain a hydrochloric acid solution. 38.7 parts of benzene sulfonylhydrazide was added to the solution while attention was given to foaming. Ice was added until the solution temperature became 0° C. or lower. After confirmation of cooling down, 19 parts of sodium nitrite was added over 30 minutes. The resultant solution was stirred at a temperature between 0° C. and 15° C. for 30 minutes. Then, sulfamic acid was added until no coloring was found on a potassium iodide starch paper. Further, 25.6 parts of barbituric acid was added and the mixture was temperature-increased to 55° C. and stirred at this temperature for 2 hours. Further, 25.6 parts of barbituric acid was added and the mixture was temperature-increased to 80° C. Then, sodium hydroxide was added until the pH became 5.

Further, the resultant mixture was stirred at 80° C. for 3 hours and then temperature-decreased to 70° C., followed by filtering and washing with hot water, to obtain a presscake. The presscake was re-slurried with 1,200 parts of hot water and then it was stirred at 80° C. for 2 hours. Then, filtering was carried out at the above temperature, washing was carried out with 2,000 parts of hot water having 80° C., and it was confirmed that benzensulfonamide moved to the filtrate side. The obtained presscake was dried at 80° C., to obtain 61.0 parts of an azobarbituric acid disodium salt.

Pigment Production Example 1

A separable four-necked flask was equipped with a thermometer, a cooling tube, a nitrogen-gas-introducing tube and a stirrer. The flask was charged with 200 parts of water. 8.1 parts of a powder of azobarbituric acid sodium salt monohydrate obtained in Intermediate Production Example 1 was added with stirring and it was confirmed that it was dispersed. The solution in which the azobarbituric acid sodium salt was uniformly dispersed was temperature-increased to 95° C. and then 5.7 parts of melamine and 0.92 part of (a) of Table 1 were added. A green solution obtained by dissolving 6.3 parts of nickel chloride hexahydrate in 30 parts of water was dropwise added over 30 minutes. After the completion of the dropwise addition, the resultant mixture was treated to form a complex at 90° C. for 1.5 hours. Then, pH was adjusted to 5.5. 20.4 parts of an emulsified-state solution obtained by stirring 4 parts of xylene, 0.4 part of sodium oleate and 16 parts of water was added and the resultant mixture was further stirred under heat for 4 hours. The mixture was cooled to 70° C. and then, promptly, it was filtered. Washing with 70° C.-hot water was repeated until inorganic salts were washed away. After the completion of the washing, a drying step and a milling step were carried out, to obtain 14 parts of a pigment.

Pigment Production Example 2

A separable four-necked flask was equipped with a thermometer, a cooling tube, a nitrogen-gas-introducing tube and a stirrer. The flask was charged with 200 parts of water. 8.1 parts of a powder of the azobarbituric acid sodium salt obtained in the Intermediate Production Example 2 was added with stirring, and it was confirmed that it was dispersed. The solution in which the azobarbituric acid sodium salt was uniformly dispersed was temperature-increased to 95° C. and then 6.0 parts of melamine and 0.46 part of (a) of Table 1 were added. A green solution obtained by dissolving 6.3 parts of nickel chloride hexahydrate in 30 parts of water was dropwise added over 30 minutes. After the completion of the dropwise addition, the resultant mixture was treated to form a complex at 90° C. for 1.5 hours. Then, pH was adjusted to 7.0, followed by filtration and washing with 70° C.-hot water, to obtain a presscake. A separable four-necked flask was equipped with a thermometer, a cooling tube, a nitrogen-gas-introducing tube and a stirrer. 60 parts of the presscake (pigment content 14 parts), 200 parts of water, 4 parts of xylene and 0.2 part of coconut fatty acid diethanol amide were charged in the flask. The mixture was stirred at 95° C. for 3 hours. The stirred mixture was cooled to 70° C. and then, promptly, filtering was carried out. Washing with 70° C.-hot water was repeated until inorganic salts were washed away. After the completion of the washing, a drying step and a milling step were carried out, to obtain 13.9 parts of a pigment.

Pigment Production Examples 3 to 11

Pigments were produced in accordance with parameters shown in Table 2. A separable four-necked flask was equipped with a thermometer, a cooling tube, a nitrogen-gas-introducing tube and a stirrer. The flask was charged with 200 parts of water. j mmol of a powder of the azobarbituric acid disodium salt obtained in the Intermediate Production Example 1 or 2 was added with stirring, and it was confirmed that the powder was dispersed. The solution in which the azobarbituric acid sodium salt was uniformly dispersed was temperature-increased to 95° C. and then n mmol of melamine and o mmol of a compound M were added. Then, promptly, a solution obtained by dissolving 26 mmol of a metal chloride k in 50 parts of water was dropwise added over 30 minutes. After the completion of the dropwise addition, the resultant mixture was treated to form a complex at 90° C. for 1.5 hours. Then, pH was adjusted to 7.0. The mixture was cooled to 60° C. 40.4 parts of an emulsified-state solution obtained by stirring 8 parts of an organic solvent p, 0.4 part of a surfactant s and 32 parts of water was added, and the resultant mixture was further stirred under heat at a temperature of t for 4 hours. The mixture was cooled to 60° C. and then, promptly, it was filtered. Washing with 60° C.-hot water was repeated until inorganic salts were washed away. After the completion of the washing, a drying step and a milling step were carried out, to obtain the pigments.

TABLE 2

| | | | | Inclusion compound | | |
|---|---|---|---|---|---|---|
| Pigment Production Example | Intermediate Production Example | mmol j | Metal Metal chloride k | Melamine mmol n | Compound of Table 1 M | mmol o |
| 1 | 1 | 25.0 | nickel chloride hexahydrate | 47.50 | (a) | 2.50 |
| 2 | 2 | 25.0 | nickel chloride hexahydrate | 48.75 | (a) | 1.25 |
| 3 | 2 | 25.0 | nickel chloride hexahydrate | 25.00 | (c) | 25.00 |
| 4 | 1 | 25.0 | nickel chloride hexahydrate | 47.50 | (d) | 2.50 |
| 5 | 2 | 25.0 | calcium chloride | 47.50 | (e) | 0.01 |
| 6 | 1 | 25.0 | ferric (II) chloride tetrahydrate | 47.50 | (f) | 0.01 |
| 7 | 2 | 25.0 | copper (II) chloride dihydrate | 47.50 | (g) | 0.01 |
| 8 | 1 | 25.0 | cobalt chloride (II) hexahydrate | 47.50 | (h) | 0.01 |
| 9 | 2 | 25.0 | chromium (III) chloride hexahydrate | 47.50 | (i) | 0.01 |
| 10 | 1 | 25.0 | tin (II) chloride dihydrate | 47.50 | (a) | 0.01 |
| 11 | 2 | 25.0 | nickel chloride hexahydrate | 47.50 | (b) | 0.01 |

| Comparative Production Example | Production Example | mmol j | Metal chloride k | Melamine mmol n | Compound of Table 1 M | mmol o |
|---|---|---|---|---|---|---|
| 1 | 1 | 25.0 | nickel chloride hexahydrate | 50.00 | nil | |
| 2 | 1 | 25.0 | nickel chloride hexahydrate | 50.00 | nil | |

| | Third Step | | |
|---|---|---|---|
| Pigment Production Example | Temperature t | Organic solvent p | Surfactant s |
| 1 | 95° C. | Xylene | B |
| 2 | 95° C. | Xylene | C |
| 3 | 90° C. | Isobutanol | C |
| 4 | 71° C. | Ethanol | B |
| 5 | 95° C. | Xylene | C |
| 6 | 95° C. | Xylene | C |
| 7 | 95° C. | Xylene | C |
| 8 | 95° C. | Xylene | C |
| 9 | 88° C. | Toluene | B |
| 10 | 78° C. | Isopropanol | B |
| 11 | 90° C. | Xylene | A |

TABLE 2-continued

| Comparative Production Example | Temperature t | Organic solvent p | Surfactant s |
|---|---|---|---|
| 1 | 95° C. | Nil | Nil |
| 2 | 95° C. | Nil | A |

Surfactant A: sodium oleate
Surfactant B: polyoxyethylene stearyl ether
Surfactant C: coconut fatty acid diethanol amide Comparative Pigment Production Example 1

A separable four-necked flask was equipped with a thermometer, a cooling tube, a nitrogen-gas-introducing tube and a stirrer. The flask was charged with 260 parts of water. 8.1 parts of a powder of the azobarbituric acid disodium salt obtained in Intermediate Production Example 1 was added with stirring. The solution in which the powder was uniformly dispersed was temperature-increased to 95° C. Then, a green solution obtained by dissolving 6.3 parts of nickel chloride hexahydrate in 30 parts of water was dropwise added over 40 minutes. After the completion of the dropwise addition, 6.3 parts of melamine was promptly added and the resultant mixture was treated to form a complex at 95° C. for 1.5 hours. Then, pH was adjusted to 5.5. The mixture was further stirred under heat for 2 hours. The mixture was cooled to 70° C. and then, promptly, it was filtered. Washing with 70° C.-hot water was repeated until inorganic salts were washed away. After the completion of the washing, a drying step and a milling step were carried out, to obtain 14.1 parts of a pigment.

Comparative Pigment Production Example 2

A separable four-necked flask was equipped with a thermometer, a cooling tube, a nitrogen-gas-introducing tube and a stirrer. The flask was charged with 260 parts of water. 8.1 parts of a powder of the azobarbituric acid disodium salt obtained in Intermediate Production Example 1 was added with stirring. The solution in which the powder was uniformly dispersed was temperature-increased to 95° C. Then, a green solution obtained by dissolving 6.3 parts of nickel chloride hexahydrate in 30 parts of water was dropwise added over 40 minutes. After the completion of the dropwise addition, 6.3 parts of melamine was promptly added and the resultant mixture was treated to form a complex at 95° C. for 1.5 hours. Then, pH was adjusted to 5.5. 0.4 part of sodium oleate was added. Then, the mixture was further stirred under heat for 2 hours. The mixture was cooled to 70° C. and then, promptly, it was filtered. Washing with 70° C.-hot water was repeated until inorganic salts were washed away. After the completion of the washing, a drying step and a milling step were carried out, to obtain 14.1 parts of a pigment.

Resin Type Dispersing Agent Production Example 1

A separable four-necked flask was equipped with a thermometer, a cooling tube, a nitrogen-gas-introducing tube and a stirrer. 70.0 parts of cyclohexanone was charged into the flask and temperature-increased to 80° C. The inside of the reactor was replaced with nitrogen. Then, a mixture solution containing 13.3 parts of n-butylmethacrylate, 4.6 parts of 2-hydroxyethylmethacrylate, 4.3 parts of a methacrylic acid, 7.4 parts of para-cumyl phenol ethyleneoxide modified acrylate (Aronix M110 supplied by TOAGOSEI Co., Ltd.) and 0.4 part of 2,2'-azobisisobutyronitrile was dropwise added over 2 hours. After the completion of the dropwise addition, the reaction was further continued for 3 hours, to obtain a solution of an acrylic resin having a solid content of 30% and a weight average molecular weight of 26,000.

The thus-obtained resin solution was cooled to room temperature. Then, about 2 g of the resin solution was sampled and it was dried under heat at 180° C. for 20 minutes to measure nonvolatile contents. Cyclohexanone was added to the above-synthesized resin solution such that the amount of nonvolatile contents became 30% by weight, to prepare an acrylic resin solution 1.

Evaluation Method—Particle diameter measurement with a transmission electron microscope, aspect ratio measurement—

The obtained pigments were measured for a particle diameter and an aspect ratio, as follows. The pigment primary particle diameter was measured by a general method in which the sizes of primary particles are directly measured from a transmission electron micrograph. Specifically, the major axis diameter and the minor axis diameter of a primary particle were measured and the average of the major axis diameter and the minor axis diameter was considered as the particle diameter of the above primary particle. With regard to 100 or more particles, the volume (weight) of each of the particles was individually obtained by making an approximation to the hexahedron of the particle diameter thereof as obtained above, and a volume average particle diameter was obtained. The volume average particle diameter was considered as an average primary particle diameter. Further, an average of the major axis diameters and an average of the minor axis diameters were respectively obtained and the ratio of major axis diameter/minor axis diameter was an aspect ratio.

Then, the above-obtained pigments were used to prepare pigment dispersions.

Example 1

12 parts by weight of the pigment obtained in the Pigment Production Example 1, 20 parts by weight of the acrylic resin solution 1 and 25 parts by weight of cyclohexanone were homogeneously stirred and mixed. Then, the mixture was dispersed with an Eiger mill using zirconia beads having a diameter of 1 mm for 3 hours. Then, filtering was carried out with a 5-μm filter, to prepare a pigment dispersion.

Examples 2 to 11

Pigment dispersions were obtained in the same manner as in Example 1 except that the pigment of the Pigment Production Example 1 was replaced with the pigments obtained in the Pigment Production Examples 2 to 11 respectively.

Comparative Example 1

A pigment dispersion was obtained in the same manner as in Example 1 except that the pigment of the Pigment Production Example 1 was replaced with the pigment obtained in the Comparative Pigment Production Example 1.

Comparative Example 2

A pigment dispersion was obtained in the same manner as in Example 1 except that the pigment of the Pigment Production Example 1 was replaced with the pigment obtained in the Comparative Pigment Production Example 2.

Then, the thus-obtained pigment dispersions were evaluated. Their viscosities were measured as an evaluation for flowability. The pigment dispersions were each placed in a 25° C. thermostatic chamber for 30 minutes and then measured for a yield value and a thixotropic index with a B type viscosimeter. Further, the dispersions were each placed in a 40° C. thermostatic room for 7 days, then placed in a 25° C. thermostatic chamber for 30 minutes and then measured for a yield value and a thixotropic index with a B type viscosimeter. Each of the pigment dispersions was independently applied to a PET film with a 4-mil film applicator and baked at 140° C. for 30 minutes, to obtain films. The thus-obtained films were measured for a gloss and a haze. In the measurement of the gloss, a 60° gloss was measured with a digital variable gloss meter (UGV-5D supplied by Suga Test Instruments Co., Ltd.). The measurement of haze was carried out using a haze meter (300A supplied by Nippon Denshoku).

Table 3 shows the evaluation results.

TABLE 3

| Examples | Pigment Production Example | TEM photographic observation Particle diameter range (major axis) | Average aspect ratio | Viscosity 6 rpm | 60 rpm | TI |
|---|---|---|---|---|---|---|
| Example 1 | 1 | 65 | 1.7 | 60.0 | 60.0 | 1.00 |
| 2 | 2 | 62 | 1.7 | 72.0 | 66.0 | 1.09 |
| 3 | 3 | 96 | 2.8 | 120.0 | 96.0 | 1.25 |
| 4 | 4 | 90 | 2.4 | 115.0 | 100.0 | 1.15 |
| 5 | 5 | 60 | 1.4 | 76.0 | 68.0 | 1.12 |
| 6 | 6 | 65 | 1.6 | 88.0 | 68.0 | 1.29 |
| 7 | 7 | 48 | 1.8 | 92.0 | 78.0 | 1.18 |
| 8 | 8 | 60 | 1.8 | 80.0 | 66.0 | 1.21 |
| 9 | 9 | 65 | 1.2 | 78.0 | 70.0 | 1.11 |
| 10 | 10 | 85 | 2.1 | 125.0 | 100.0 | 1.25 |
| 11 | 11 | 70 | 1.6 | 100.0 | 80.0 | 1.25 |

| Comparative Example | Comparative Production Example | Particle diameter range (major axis) | Average aspect ratio | 6 rpm | 60 rpm | TI |
|---|---|---|---|---|---|---|
| 1 | 1 | 110 | 3.200 | 1200.0 | 420.0 | 2.86 |
| 2 | 2 | 110 | 3.400 | 1000.0 | 300.0 | 3.33 |

| Examples | Viscosity (40° C. 7 days) | | | Coated film properties | |
|---|---|---|---|---|---|
| Example | 6 rpm | 60 rpm | TI | Haze | 60° gloss |
| 1 | 500.0 | 320.0 | 1.56 | 8.00 | 132.00 |
| 2 | 75.0 | 60.0 | 1.25 | 6.82 | 140.80 |
| 3 | 400.0 | 360.0 | 1.11 | 7.96 | 132.80 |
| 4 | 115.0 | 100.0 | 1.15 | 7.99 | 132.60 |
| 5 | 77.0 | 70.0 | 1.10 | 8.12 | 130.50 |
| 6 | 90.0 | 70.0 | 1.29 | 7.96 | 132.70 |
| 7 | 120.0 | 98.0 | 1.22 | 7.82 | 133.80 |
| 8 | 110.0 | 102.0 | 1.08 | 7.95 | 132.60 |
| 9 | 150.0 | 110.0 | 1.36 | 7.87 | 133.10 |
| 10 | 225.0 | 180.0 | 1.25 | 8.16 | 130.10 |
| 11 | 140.0 | 110.0 | 1.27 | 8.08 | 130.80 |

| Comparative Example | 6 rpm | 60 rpm | TI | Haze | 60° gloss |
|---|---|---|---|---|---|
| 1 | 5000.0 | 2400.0 | 2.08 | 33.20 | 72.30 |
| 2 | 3600.0 | 1460.0 | 2.47 | 18.60 | 96.00 |

Further, when pigment compositions obtained according to the present invention were used in a cellulose nitrate lacquer, an acrylic resin coating and a gravure ink, excellent flowability was shown without causing agglomeration.

The invention claimed is:

1. An azobarbituric acid metal complex pigment comprising an azobarbituric acid metal complex of the formula (1), melamine in an amount of 1.0 to 1.95 mol per mol of the azobarbituric acid metal complex and a compound of the formula (2) in an amount of 0.05 to 1.0 mol per mol of the azobarbituric acid metal complex,

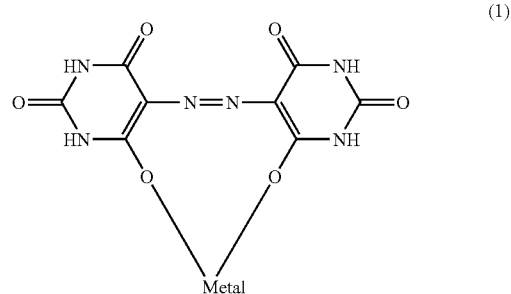

wherein Metal represents Fe, Ni, Cu, Cs, Cd, Co, Al, Cr, Sn, Pb or Mn,

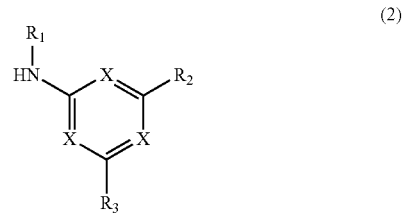

wherein X represents a carbon atom or a nitrogen atom, $R_1$ represents a hydrogen atom, a substituted or non-substituted phenyl group or a nitrogen-containing heterocyclic residue, $R_2$ represents an alkyl group having 1 to 6 carbon atoms, an amino group, a hydroxyl group, a chlorine atom, a bromine atom, —$NR_5R_6$ or —NH—$R_4$—$NR_5R_6$, $R_3$ represents —$NR_5R_6$ or —NH—$R_4$—$NR_5R_6$, $R_4$ represents an alkylene group having 1 to 6 carbon atoms, and each of $R_5$ and $R_6$ represents an alkyl group having 1 to 6 carbon atoms or an alkenyl group.

2. The azobarbituric acid metal complex pigment according to claim 1, wherein the average particle diameter of pigment primary particles is 20 nm to 200 nm, the pigment primary particles have a major axis diameter and a minor axis diameter and the ratio of the major axis diameter and the minor axis diameter is 1:1 to 3:1.

3. A process for the production of the azobarbituric acid metal complex pigment recited in claim 1, which process comprises a first step of obtaining an azobarbituric acid from a barbituric acid, a second step of reacting the azobarbituric acid, melamine, a compound of the formula (2) and a metal salt in water to obtain a crude metal complex pigment, and a third step of growing crystals of the crude metal complex pigment in a mixture of an organic solvent and water in the presence of a surfactant.

4. The process according to claim 3, wherein the organic solvent is at least one solvent selected from the group consisting of isobutanol, isopropanol, ethanol, methanol, xylene and toluene.

5. A pigment composition obtained by further incorporating a resin pigment dispersing agent into the azobarbituric acid metal complex pigment recited in claim 1.

6. The pigment composition according to claim 5, wherein the resin pigment dispersing agent is a polymer having a weight average molecular weight of 1,000 to 100,000 and having a functional group at a side chain.

7. A pigment composition according to claim 5, wherein the resin pigment dispersing agent has an acid value or an amine value of 5 to 200 mgKOH/g.

8. A pigment dispersion obtained by dispersing the pigment composition recited in claim 5 in a vehicle.

* * * * *